United States Patent Office 3,370,059
Patented Feb. 20, 1968

3,370,059
2 - DIETHYLAMINOETHYLMERCAPTO AND 2-MORPHOLINOETHYLMERCAPTO - CHLORO-PYRIDINES
Wilhelm A. Schuler, Bad Homburg, and Helmut Beschke, Frankfurt am Main, Germany, assignors to Deutsche Gold- und Silber-Scheideanstalt vormals Roessler, Frankfurt am Main, Germany
No Drawing. Continuation-in-part of application Ser. No. 267,335, Mar. 22, 1963. This application Apr. 15, 1965, Ser. No. 448,235
Claims priority, application Germany, Mar. 27, 1962, D 38,499; Jan. 23, 1963, D 40,747
3 Claims. (Cl. 260—247.1)

This is a continuation-in-part of application Ser. No. 267,335, filed Mar. 22, 1963, now abandoned.

The present invention relates to novel pyridine derivaties of the general formula

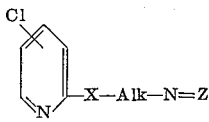

wherein the Cl substituent indicated is in position 3, 5 or 6, as well as their salts and quaternary ammonium compounds.

In such formula

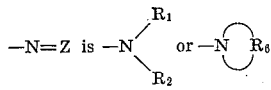

wherein $R_1$ and $R_2$ are lower alkyl groups, $R_6$ is an alkylene, oxa alkylene or aza alkylene group forming a 5 or 6 membered ring with the nitrogen atom to which it is attached, example of such heterocyclic rings, for example, are morpholino and piperidino. Alk is a lower straight or branch chained alkylene radical of 2 to 4 carbon atoms, X is sulfur or oxygen.

The novel compounds according to the invention have good pharmacological properties and especially analgesic and antiphlogistic properties.

The novel compounds can be prepared by reacting a pyridine of the formula

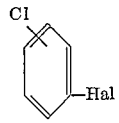

in which Hal is chlorine or bromine with a compound of the formula

The reaction preferably is carried out at raised temperatures with the aid of basic condensing agents such as potash, sodium ethylate or other basic substances such as tertiary amines.

It also is possible to condense a pyridine derivative of the formula

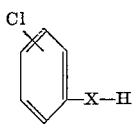

with a compound of the formula

preferably in an inert solvent and in the presence of basic agents such as sodium ethylate or sodium amide at raised temperatures.

Finally, the compounds according to the invention may also be obtained by reaction of a compound of the general formula

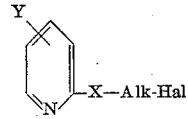

with an amine of the general formula

preferably in an inert solvent using basic condensing agents, for example potassium carbonate.

The bases which are produced can be converted into their acid addition salts or quaternary ammonium compounds. Preferably, acids having pharmaceutically acceptable anions such as hydrochloric, sulfuric, phosphoric, maleic and the like acids are employed in the preparation of the salts but, of course, any given salt is easily convertible into any other more desired salt or the free base.

The following examples will serve to illustrate the invention with reference to several specific embodiments thereof. In such examples the proportions are given by weight unless otherwise specified.

Example 1

20 parts of a 50% suspension of sodium amide in toluene were added to 32 parts of morpholinoethylmercaptan dissolved in 300 parts of xylene and the mixture heated under reflux until gas evolution ceased. Thereafter 33 parts of 2,3-dichloropyridine dissolved in 200 parts of xylene were added dropwise and the mixture refluxed for an hour. After cooling down water was added to the reaction mixture and the xylene layer extracted with dilute HCl at a pH of 4. The aqueous acid extract was then neutralized with NaOH and extracted with ether. The ether extract was dried and distilled under vacuum. 32 parts of 2-(morpholino-ethyl-mercapto)-3-chloropyridine distilled over at 164–168° C. at 0.5 mm. Hg pressure. The hydrochloride thereof precipitated from isopropanol and recrystallized has a melting point of 181° C.

Example 2

43 parts of a 50% suspension of sodium amide in toluene were added to 75 parts of 2-hydroxy-6-chloropyridine dissolved in 750 parts of toluene and the mixture refluxed. Thereafter 70 parts of dimethylaminoethyl chloride were added dropwise and the mixture refluxed for a further 3 hours. The reaction mixture was processed as in Example 1 and 53 parts of 2-(dimethylaminoethoxy) 6-chloropyridine of a boiling point of 115–122° C. at 11 mm. Hg pressure recovered therefrom. The hydrochloride thereof melts at 146–148° C.

Example 3

The process of Example 2 was repeated using dimethylaminopropyl chloride instead of dimethylaminoethyl chloride. The resulting 2-(dimethylaminopropoxy)-6-chloropyridine had a boiling point of 134–138° C. at 10 mm. Hg. The hydrochloride thereof had a melting point of 181–183° C.

Example 4

2-(morpholinoethylmercapto)-6-chloropyridine was obtained analogously to Example 1 using 2,6-dichloropyridine instead of 2,3-dichloropyridine. The hydrochloride thereof had a melting point of 163–165° C.

Example 5

24 parts of a 50% sodium amide suspension in toluene were added dropwise to a solution of 44 parts of morpholinopropanol in 300 parts of toluene boiling under reflux. After the reaction had ended 45 parts of 2,3-dichloropyridine dissolved in 200 parts of toluene were added dropwise and the reaction refluxed for a further 2 hours. The reaction mixture was poured into water and the toluene layer extracted with dilute HCl at a pH of 4 and the resulting aqueous acid extract alkalized and extracted with ether. The ether extract was dried and distilled under vacuum. 63 parts of 2-(morpholinopropoxy)-3-chloropyridine distilled over at 149–151° C. at 1 mm. Hg. The hydrochloride was produced with isopropanolic HCl and crystallized from isopropanol. Its melting point was 151–162° C.

Example 6

Analogously to Example 1, 2 - (morpholinoethylmercapto)-3-methylpyridine was obtained using 2-bromo-3-methylpyridine in place of the 2,3-dichloropyridine. The hydrochloride thereof had a melting point of 169–171° C.

Example 7

Analogously to Example 6, 2-(morpholinopropoxy)-6-chloropyridine was obtained using 2,6-dichloropyridine instead of 2,3-dichloropyridine. The hydrochloride thereof had a melting point of 164–167° C.

Example 8

Analogously to Example 1, 2-(piperidinoethylmercapto)-3-chloropyridine was obtained using piperidinoethylmercaptan instead of morpholinoethylmercaptan. The hydrochloride thereof had a melting point of 181–183° C.

Example 9

7 parts of sodium were dissolved in 200 parts of ethanol and 42 parts of diethylaminoethylmercaptan and 47 parts of 2,5-dichloropyridine were added to the resulting solution. The ethanol was distilled off while stirring and the reaction mixture then maintained at 150° C. for 2 hours. The reaction product was extracted with dilute HCl, such extract alkalized and extracted with ether and the ether extract dried and distilled. 61 parts of 2-(diethylaminoethylmercapto)-5-chloropyridine distilled over at 121–124° C. at 1 torr. The hydrochloride thereof has a melting point of 162–163° C.

Example 10

8 parts of sodium were dissolved in 200 parts of ethanol and 47 parts of diethylaminoethylmercaptan and 52 parts of 2,6-dichloropyridine were added to the resulting solution. The ethanol was distilled off while stirring and the reaction mixture then heated for 1 hour at 150° C. The reaction product was extracted and distilled as in Example 9. 68 parts of 2-(diethylaminoethylmercapto)-6-chloropyridine distilled over at 136–141° C. at 2 torr. The hydrochloride thereof has a melting point of 195–198° C.

Example 11

29 parts of morpholino-n-propanol were dissolved in 250 parts of xylene and 16 parts of sodium amide (50% in toluene) added thereto while stirring under reflux. After the reaction ended, 30 parts of 2,5-dichloropyridine dissolved in 50 parts of xylene were added gradually. After the addition was completed the reaction mixture was boiled for a further 2 hours. The product was washed with water and distilled. 38 parts of 2-(morpholino-n-propoxy)-5-chloropyridine distilled over at 1 torr. The hydrochloride thereof has a melting point of 174–175° C.

Example 12

23 parts of diethylamino-n-propanol were placed in 100 parts of xylene and reacted with 12 parts of sodium amide (50% in toluene) and after addition of 25 parts of 2,5-dichloropyridine dissolved in 70 parts of xylene the reaction mixture was boiled for a further 2 hours. The product was washed with water and distilled. 35 parts of 2-(diethylamino-n-propoxy)-5-chloropyridine distilled over at 120–135° C. The hydrochloride thereof has a melting point of 121–122° C.

We claim:
1. 2-(diethylaminoethylmercapto)-6-chloropyridine.
2. 2-(morpholinoethylmercapto)-6-chloropyridine.
3. 2-(morpholinoethylmercapto)-3-chloropyridine.

References Cited

Semonsky et al., Chemical Abstracts, vol. 50, p. 3438i (1956).

Musante et al., Chemical Abstracts, vol. 50, p. 986a (1956).

ALEX MAZEL, *Primary Examiner.*

J. TOVAR, *Assistant Examiner.*